United States Patent [19]
Langendorf et al.

[11] Patent Number: 6,047,334
[45] Date of Patent: Apr. 4, 2000

[54] SYSTEM FOR DELAYING DEQUEUE OF COMMANDS RECEIVED PRIOR TO FENCE COMMAND UNTIL COMMANDS RECEIVED BEFORE FENCE COMMAND ARE ORDERED FOR EXECUTION IN A FIXED SEQUENCE

[75] Inventors: Brian K. Langendorf, El Dorado Hills; David J. Harriman; Robert J. Riesenman, both of Sacramento, all of Calif.

[73] Assignee: Intel Corporation, Santa Clara, Calif.

[21] Appl. No.: 08/877,126

[22] Filed: Jun. 17, 1997

[51] Int. Cl.[7] .............................. G06F 13/14; G06F 9/40
[52] U.S. Cl. ........................... 710/5; 710/6; 710/24; 710/58; 712/225; 712/245; 713/401; 709/3
[58] Field of Search ..................... 395/672, 825, 395/826, 844, 878, 566, 595, 552; 710/5, 6, 24, 58; 712/225, 245; 713/401; 709/3

[56] References Cited

U.S. PATENT DOCUMENTS

| | | | |
|---|---|---|---|
| 5,418,971 | 5/1995 | Carlson | 395/800 |
| 5,517,611 | 5/1996 | Deering | 395/163 |
| 5,603,063 | 2/1997 | Au | 395/872 |
| 5,758,051 | 5/1998 | Moreno et al. | 395/181 |
| 5,765,037 | 6/1998 | Morrison et al. | 395/557 |
| 5,911,051 | 6/1999 | Carson et al. | 395/287 |

OTHER PUBLICATIONS

"Accelerated Graphics Port Interface Specification Revision 1.0", Published by Intel Corporation, Jul. 31, 1996, pp. 1–151.

*Primary Examiner*—Thomas C. Lee
*Assistant Examiner*—Rehana Perveen
*Attorney, Agent, or Firm*—Blakely, Sokoloff, Taylor & Zafman LLP

[57] ABSTRACT

A method and apparatus for fencing the execution of commands. A fence command and an executable command are received in succession. The executable command is enqueued in a first queue together with an indication that the executable command succeeded the fence command. A synchronization value is enqueued in a second queue. The executable command is then delayed from being dequeued from the first queue until the synchronization value is advanced to the head of the second queue.

18 Claims, 13 Drawing Sheets

SYSTEM FOR DELAYING DEQUEUE OF COMMANDS RECEIVED PRIOR TO FENCE COMMAND UNTIL COMMANDS RECEIVED BEFORE FENCE COMMAND ARE ORDERED FOR EXECUTION IN A FIXED SEQUENCE

FIELD OF THE INVENTION

The present invention relates to the field of command reordering. More particularly, this invention relates to a method and apparatus for fencing the execution of commands in a device that implements command reordering.

BACKGROUND OF THE INVENTION

In prior art devices that implement command and data reordering, commands and data are typically received in one or more queues referred to as "command queues". Eventually, the commands and data are dequeued from the command queues into a reordering domain where arbitration logic reorders the commands and data for execution or processing according to certain optimization policies.

Occasionally it is necessary to prevent commands and data from being reordered ahead of a previously received command or data value. This is accomplished according to one prior-art technique by using a special command called a "fence" command. In essence, data and commands received after a fence command are prevented from being reordered for execution or processing ahead of data and commands received before the fence command.

In prior-art devices that support the use of fence commands to control command and data reordering, fence commands are typically enqueued in the command queue like other commands and therefore consume storage space in the command queue. One disadvantage of this prior-art technique allocating queue storage to fence commands is that a command queue designed to hold a specified number of executable (i.e., non-fence) commands must be enlarged to hold a potentially unlimited number of fence commands. This consumes device resources and results in increased cost. This particularly true in the context of an integrated circuit, where enlarging the command queue results in increased gate count and potentially increased die size.

SUMMARY OF THE INVENTION

A method and apparatus for fencing the execution of commands is disclosed. A fence command and an executable command are received in succession, and the executable command is enqueued in a first queue together with an indication that the executable command succeeded the fence command. A synchronization value is enqueued in a second queue. The executable command is then delayed from being dequeued from the first queue until the synchronization value is advanced to the head of the second queue.

DESCRIPTION OF THE DRAWINGS

The present invention is illustrated by way of example and not limitation in the figures of the accompanying drawings in which like references indicate similar elements and in which.

DETAILED DESCRIPTION

Figure 1:
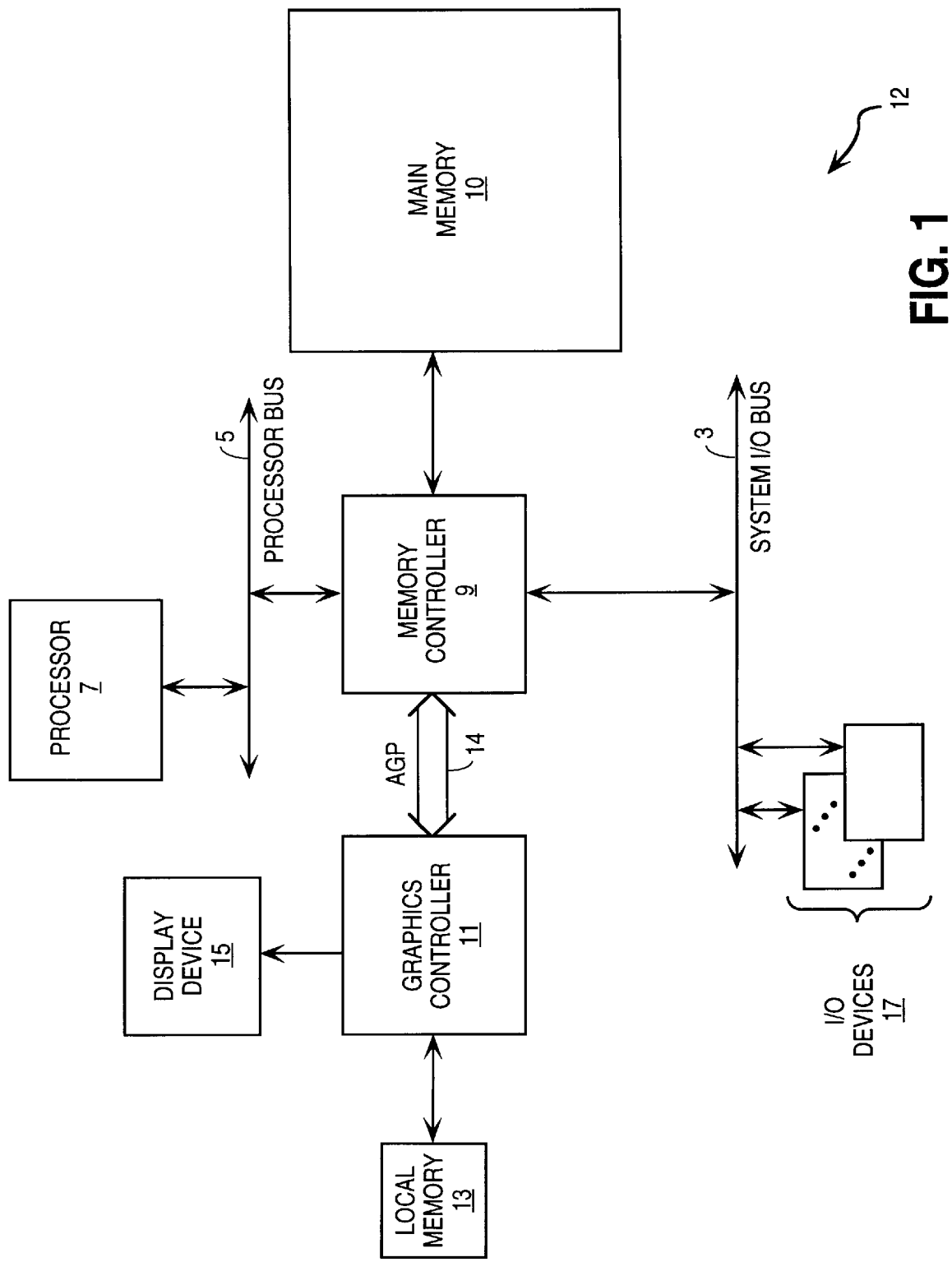
FIG. 1 depicts a computer architecture in which the present invention may be implemented.

Overview of One Embodiment of the Present Invention

In a computer program such as a video game or other image-rendering program that displays perspective views of a three-dimensional (3D) scene, it is common to represent objects in the 3D scene as polygons having bit maps applied to their surface. Such bit maps are referred to as "texture maps" because they are used to give a sense of texture to the polygonal objects to which they are applied. For example, a brick alleyway can be represented by a four-sided polygon having a brick texture map mapped thereon. Viewed from an overhead perspective, the polygon might be a rectangle and the bricks of the texture map would be more or less evenly spaced from one another. However, as the viewer's perspective drops from being directly overhead to a surface level view, the polygon becomes wider at the end nearest the point of view and narrower at the end furthest from the point of view. Further, the position of the bricks relative to one another becomes increasingly compressed in the direction away from the point of view.

Although it is intuitive that the overhead view and the surface view of a brick alleyway are simply two different perspectives of the same scene, the overhead and surface images rendered on a display are actually quite different from one another. Because there is a potentially infinite number of different perspectives of a given 3D scene, it is not practical to store each of the different images corresponding to the different perspectives; too much storage would be required. Instead, by applying texture maps to various polygons within the scene and reshaping the polygons and remapping the texture maps to the polygons as the perspective of the viewer changes, it possible to render perspective views of the 3D scene in real-time.

Although texture maps allow 3D scenes to be rendered using far less storage than a database of pre-generated images, texture maps can still require considerable storage space. Also, more detailed scenes typically require more texture maps. It is not uncommon for a large, detailed video game to require as much as 40 megabytes (MB) of storage for texture maps alone.

Of course, the ability to render 3D scenes in real-time requires that texture maps be rapidly accessible and texture maps have traditionally been stored in a specialized memory that has relatively low-access latency and is local to the graphics controller. Unfortunately, specialized graphics controller memory is expensive, and even high-end computer systems often do not have a large enough graphics controller memory to store all the texture maps for a given scene-rendering program. Also, since the majority of application programs that are run on general-purpose computers do not require such a large graphics controller memory, the cost of a large graphics controller memory is often not worth the benefit.

One technique for providing low-latency access to large texture maps is addressed in a specification called the "Accelerated Graphics Port Interface Specification Revision 1.0" (hereinafter the "AGP specification"), published Jul. 31, 1996 by Intel™ Corporation. The AGP specification describes a data and command path called the accelerated graphics port (AGP) through which a graphics controller may achieve relatively low-latency access to a computer system's main memory (typically DRAM). According to the AGP specification, the graphics controller interfaces directly to the memory controller of the main memory instead of accessing main memory via the system bus. This removes the need for the graphics controller to arbitrate with other bus master devices for control of the system bus and therefore lowers the overall memory access latency.

The AGP specification also describes a relaxed memory access protocol in which read operations and write operations may be reordered with respect to one another in order to optimize data transfer to and from main memory. More specifically for a given sequence of read and write commands issued by the graphics controller and executed by a memory controller, the following rules apply:

1. Read commands may be executed out of order with respect to other read commands so long as the data ultimately returned to the graphics controller is ordered according to the original read command sequence.

2. Write commands may be executed out of order with respect to other write commands except that a write command may not be reordered for execution ahead of another write command that references the same memory address.

3. Read commands may be executed out of order with respect to write commands and write commands may be executed out of order with respect to read commands except that a read command may not be reordered for execution ahead of a write command that references the same memory address.

Although performance benefits are achieved by virtue of the relaxed memory access policy (e.g., by producing higher page hit rates to improve memory access time), it is occasionally necessary to ensure that a given memory access command is not reordered for execution ahead of memory access commands previously issued by the graphics controller. This is referred to as "fencing" the order of command execution and is accomplished by using a fence command.

As discussed above, in prior art devices that implement command reordering, fence commands are typically enqueued for processing in the same manner as other commands and therefore consume storage space in the command queue. This is particularly problematic in the context of the AGP, because the AGP specification permits unlimited fence commands to be sent to the memory controller in succession and yet requires that the memory controller always be able to queue a specified number of memory access commands (i.e., non-fence commands). Even if back to back fence commands were collapsed into a single entry in a memory controller command queue, the size of a command queue required to hold N memory access commands would still be 2×N to account for a command sequence in which a fence command follows every memory access command.

According to one embodiment of the present invention, rather than enqueue fence commands in a command queue within a memory controller, a flag is set upon receipt of the fence command. The flag is reset upon receipt of the next memory access command and the memory access command is enqueued together with an indication that the memory access command succeeded the fence command. In this way, the fence is indicated without dedicating an entire queue entry to the fence command.

In the event that the memory controller contains multiple command queues, a synchronization value is enqueued in each other command queue that is used to enqueue commands that must not be reordered across the fence command. The memory access command that succeeded the fence command is then delayed from being dequeued from the command queue into which it was inserted until the synchronization values are advanced to the respective heads of the other command queues. The memory access command that succeeded the fence command is also delayed from being dequeued until commands received prior to the fence command have been flushed from a reordering domain of the memory controller and placed in a fixed order for execution.

Exemplary Embodiments of the Present Invention

FIG. 1 depicts a computer architecture 12 including a processor 7, memory controller 9, main memory 10, graphics controller 11, local graphics memory 13, display device 15 and I/O devices 17. As shown, the processor 7 is coupled to memory controller 9 via a processor bus 5. The processor issues memory read and write request signals to the memory controller 9 which, in response, writes and reads the indicated locations in main memory 10. The processor also issues I/O write and read signals to memory controller 9 which, in turn, transfers the I/O write and read signals to the I/O devices 17 via system I/O bus 3. The I/O devices 17 may include any addressable devices necessary to support the needs of the computing system. For example, if computer architecture 12 is used to implement a general purpose computer, the I/O devices 17 would typically include input devices such as a keyboard and screen pointing device, mass storage devices such as magnetic and optical disk drives, network connection devices such as a modem and an area network card, and so forth.

As shown in FIG. 1, graphics controller 11 has direct access to local graphics memory 13 and also has access to main memory 10 by way of the accelerated graphics port (AGP) 14 to memory controller 9. Graphics controller 11 typically includes one or more processors to perform graphics computations and to output a video data stream to display device 15. The AGP 14 may also be accessed by processor 7 via processor bus 5 and memory controller 9 to write and read graphics controller 11.

It will be appreciated that while architecture 12 is depicted as a multiple-bus architecture in which the processor 7 is the sole central processing unit (CPU), alternate bus arrangements and additional CPU's may be employed without departing from the spirit and scope of the present invention.

Figure 2:
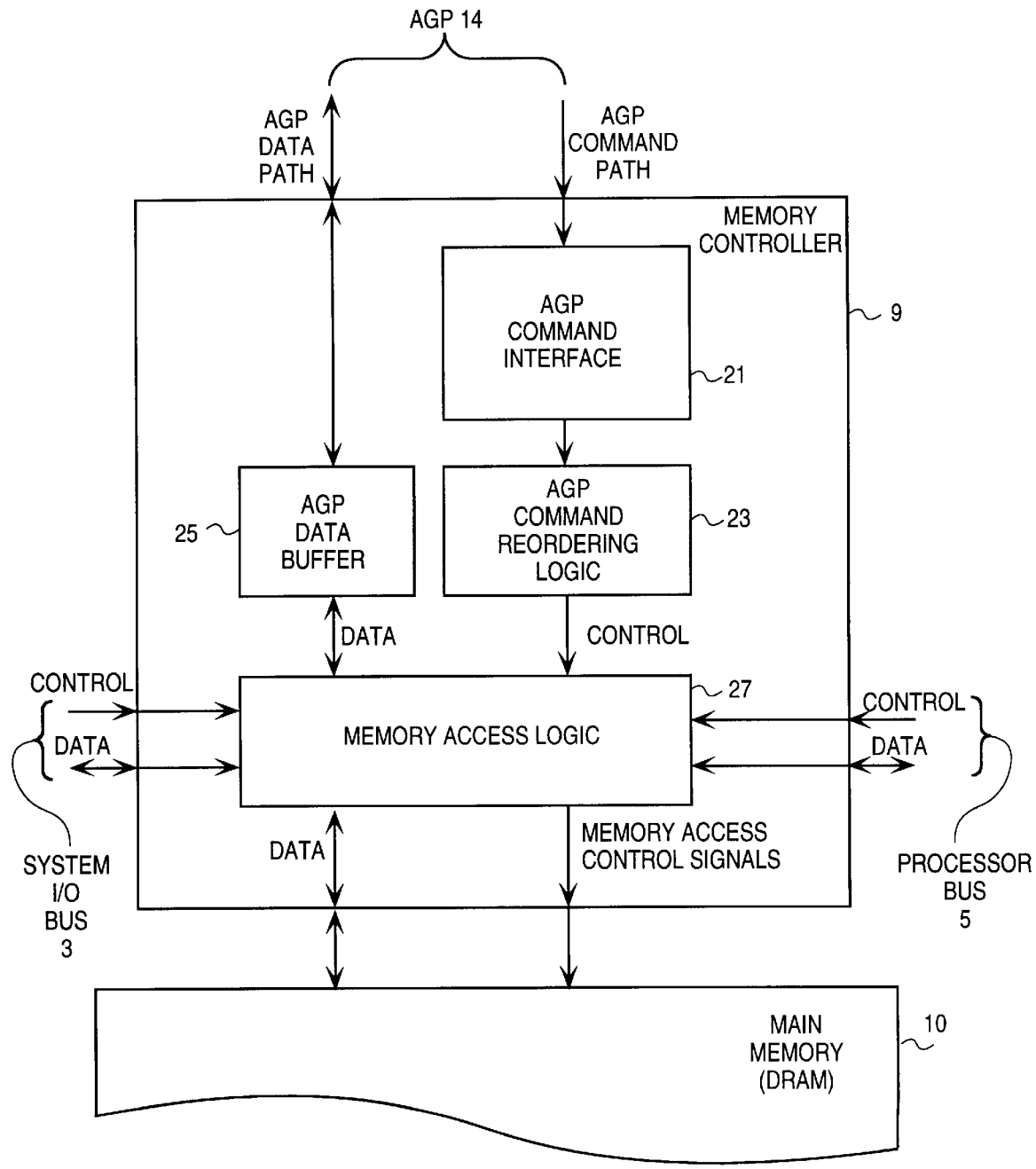
FIG. 2 illustrates a memory controller according to one embodiment of the present invention.

FIG. 2 illustrates the memory controller 9 of FIG. 1 according to one embodiment of the present invention. As shown, the AGP coupled to memory controller 9 includes both an AGP data path and an AGP command path. The AGP data path is coupled to transfer data to and from AGP data buffer 25. The AGP command path is coupled to deliver memory access commands to AGP command interface 21. At least three types of commands are received in the AGP command interface 21: memory read commands, memory write commands and fence commands. Herein, memory read commands and memory write commands are referred to collectively as memory access commands. The expression "executable command" also appears occasionally herein and refers to any command or other value (except a synchronization value) for which a command queue entry is allocated.

Memory access commands are passed from AGP command interface 21 to AGP command reordering logic 23 where they are reordered for execution according to various optimization strategies. The reordered memory access commands are then output as control signals to memory access logic 27. Memory access logic 27 receives the control signals from the AGP command reordering logic 23 and, if the control signals indicate a memory write operation, receives the data to be written from AGP data buffer 25. If the control signals from AGP command reordering logic 23 indicate a memory read operation, memory access logic 27 performs the read operation and outputs the data to AGP data buffer 25. In addition to receiving signals from the AGP data buffer and AGP command reordering logic, memory access logic 27 is also coupled to receive control signals from the system I/O bus 3 and the processor bus 5, and to receive or output data on the system I/O bus 3 and the processor bus 5. Memory access logic 27 outputs memory access control signals to main memory 10 and transfers data to and from main memory 10. Main memory 10 is indicated in FIG. 2 to be DRAM (dynamic random-access memory) so that the memory access control signals output by memory access logic 27 would typically include at least row and column address strobe signals and a write enable signal. Other memory components may be used to implement main memory 10, in which case different memory access control signals may be necessary.

Figure 3:
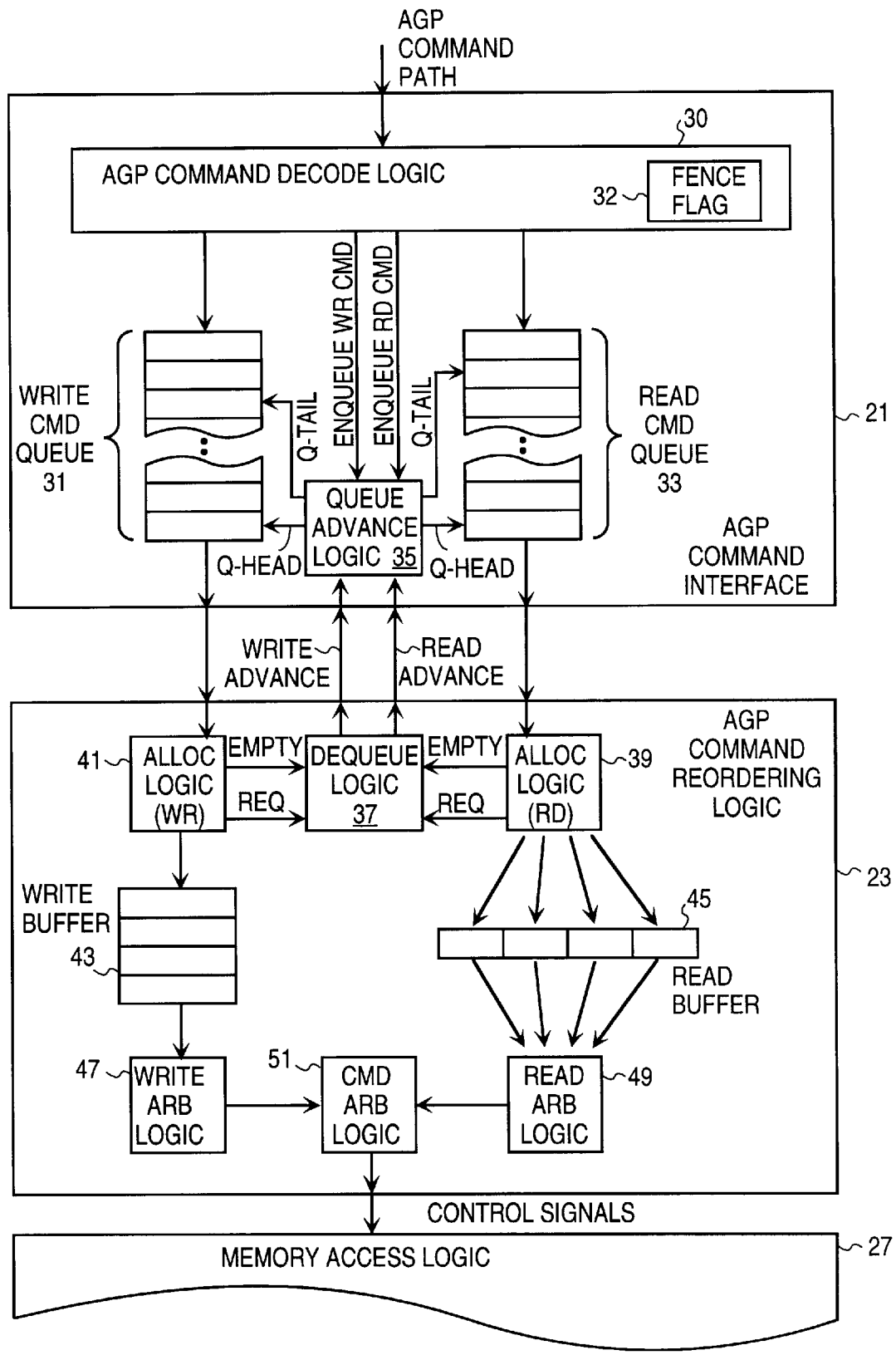
FIG. 3 illustrates a command interface and command reordering logic according to one embodiment of the present invention.

FIG. 3 illustrates the AGP command interface 21 and AGP command reordering logic 23 according to one embodiment of the present invention. AGP command interface 21 includes AGP command decode logic 30, a write command queue 31, a read command queue 33 and queue advance logic 35. Memory access commands are received in the AGP command decode logic 30 via the AGP command path. The AGP command decode logic 30 decodes the commands to determine whether they are write commands or read commands and then enters the commands into either the write command queue 31 or the read command queue 33 accordingly. As discussed further below, one purpose for having separate command queues for memory write and read commands is to allow the write and read commands to be reordered relative to one another.

As shown in FIG. 3, the AGP command decode logic asserts a pair of command-enqueue signals ("ENQUEUE WR CMD" and "ENQUEUE RD CMD" in FIG. 3) to queue advance logic 35 indicating that either a write command or a read command should be enqueued. Upon receiving a command to enqueue a write command or a read command, queue advance logic 35 adjusts a queue tail pointer (labeled "Q-TAIL" in FIG. 3) to point to the next entry in the write command queue 31 or the read command queue 33, respectively, and the indicated command is stored therein.

According to the AGP specification, the memory controller (e.g., element 9 of FIG. 2) must be capable of enqueuing a specified number of memory access commands (the specified number being referred to herein as N). Also, to avoid overwriting the memory controller command queue, there may not be more than N outstanding memory access commands issued by the graphics controller (e.g., element 11 of FIG. 1). An outstanding memory access command is one which, from the perspective of the graphics controller (e.g., element 11 of FIG. 1), has not been completed. For example, an outstanding memory read command is a read command for which the graphics controller has not received the requested data and an outstanding memory write command is a write command for which the corresponding data has not yet been transferred from the graphics controller to the memory controller. As discussed below, in one embodiment of the present invention, the memory controller signals the graphics controller to transfer the write data when the corresponding write command is received in the AGP command reordering logic 23 of the memory controller.

The foregoing constraints set forth in the AGP specification have implications for the AGP command interface 21. For example, because there is no restriction on the number of successive write or read commands that may be received via the AGP command path, the write command queue 31 must be capable of holding N write commands and the read command queue 33 must be capable of holding N read commands. Also, because there may be no more than N outstanding memory access commands, it is not possible for one of the write and read command queues (31 and 33) to enqueue a memory access command without the other of the write and read command queues (31 and 33) also having an available entry. This can be seen by the following analysis in which $E_{Q1}$ is the number of entries in one of the write and read queues (31 and 33) and $E_{Q2}$ is the number of entries in the other write and read queues (31 and 33):

Suppose that upon enqueuing a memory access command in $E_{Q1}$, there are N memory access commands outstanding. Thus:

$$E_{Q1}+E_{Q2}=N, \text{ so that } E_{Q1}=N-E_{Q2};$$

Now because $E_{Q1}$ contains at least one entry $$E_{Q1}>0, \text{ so that } E_{Q2}<N.$$

Because $E_{Q2}$ must be less than N, and because the write and read command queues (31 and 33) are each at least size N, it follows that the one of the write and read queues (31 and 33) having $E_{Q2}$ entries must be capable of enqueuing at least one additional value. As discussed below, this circumstance is exploited in the present invention.

Queue advance logic 35 receives write queue and read queue advance signals from AGP command reordering logic 23 and advances the queue head pointer (labeled "Q-HEAD" in FIG. 3) to point to the next entry in the write command queue 31 and read command queue 33, respectively. The effect of advancing a head pointer in either the read command queue 33 or the write command queue 31 is to dequeue the entry previously pointed at by the head pointer. It will be appreciated that by adjusting queue head and tail pointers to dequeue and enqueue commands in the write and read command queues (31 and 33), the queued commands themselves do not have to be moved from location to location to pass through the queue. Instead, only the head and tail pointers need be adjusted to implement the first-in, first-out (FIFO) operation of the queue. When the head or tail reaches a first or last storage location in the N-sized memory element used to implement the queue, the head or tail is wrapped around to the other end of the N-sized memory element. In other words, according to one embodiment of the present invention, write command queue 31 and read command queue 33 are implemented by way of a ring-like queue in which the final storage location is considered to be logically adjacent to the first storage location. It will be appreciated that other embodiments of the write command queue 31 and the read command queue 33 are possible. For example, once enqueued, memory access commands could be shifted from storage location to storage location until finally reaching a head storage location from which they are output to the AGP command reordering logic 23. In such an implementation, the location of the queue head is static so that the queue head pointer is not required. Other FIFO buffer arrangements may be used to implement the write command queue 31 and read command queue 33 without departing from the spirit and scope of the present invention.

As shown in FIG. 3, AGP command decode logic 30 includes a fence flag 32. Fence flag 32 is a storage element that is set to a first logical state when a fence command is received in the AGP command decode logic 30, and reset to a second logical state when a non-fence command (i.e., an executable command) is received in the AGP command decode logic 30. As discussed further below, when the fence flag is set, indicating that a fence command was the command most recently received in the AGP command decode logic 30, the next memory access command received in the AGP command decode logic 30 is enqueued in either the write command queue 31 or the read command queue 33 along with an indication that the memory access command succeeded the fence command. According to one embodiment of the present invention, the fence flag is reset to the second logical state upon system initialization.

AGP command reordering logic 23 includes dequeue logic 37, write allocation logic 41, write buffer 43, write arbitration logic 47, read allocation logic 39, read buffer 45, read arbitration logic 49 and command arbitration logic 51.

Write allocation logic 41 is coupled to forward write commands received from the write command queue 31 to write buffer 43. According to one embodiment of the present invention, write allocation logic outputs at least two signals to dequeue logic 37 based on the state of the write buffer 43. If write buffer 43 has storage available to receive a write command, allocation logic asserts a request signal (indicated as "REQ" in FIG. 3) to dequeue logic 37. If write buffer 43 has been completely flushed (i.e., all write commands previously stored therein have been ordered for execution by command arbitration logic 51), allocation logic 41 outputs an empty signal (indicated as "EMPTY" in FIG. 3).

According to one embodiment of the present invention, when a write command is stored in write buffer 43, data retrieval logic (not shown) within AGP command reordering logic 23 signals the graphics controller (e.g., element 11 of FIG. 1) that the data corresponding to the write command is required. Write arbitration logic 47 determines when data corresponding to a given write command has been received and arbitrates among ready write commands to be forwarded to command arbitration logic 51.

As discussed above, write commands can generally be executed out of order with respect to one another except that a write command cannot be reordered for execution ahead of a write command referencing the same memory address. Write buffer 43 is depicted in FIG. 3 in queue format to emphasize this restriction on the otherwise free reordering of write commands. Write arbitration logic 47 includes logic to implement the above described reordering restriction and also to select from among two or more ready write commands based on certain optimization criteria (e.g., page hit optimization). In an alternative embodiment of the present invention, memory write commands may not be reordered relative to one another, and instead may only be reordered relative to memory read commands.

Read allocation logic 39 forwards read commands from read command queue 33 to available storage locations in read buffer 45. According to one embodiment of the present invention, read allocation logic 39 outputs at least two signals to dequeue logic 37: a request signal to indicate that read buffer 45 has one or more available storage locations, and an empty signal to indicate that read buffer 45 has been completely flushed (i.e., all read commands previously stored in read buffer 45 have been ordered for execution by command arbitration logic 51).

Figure 5:
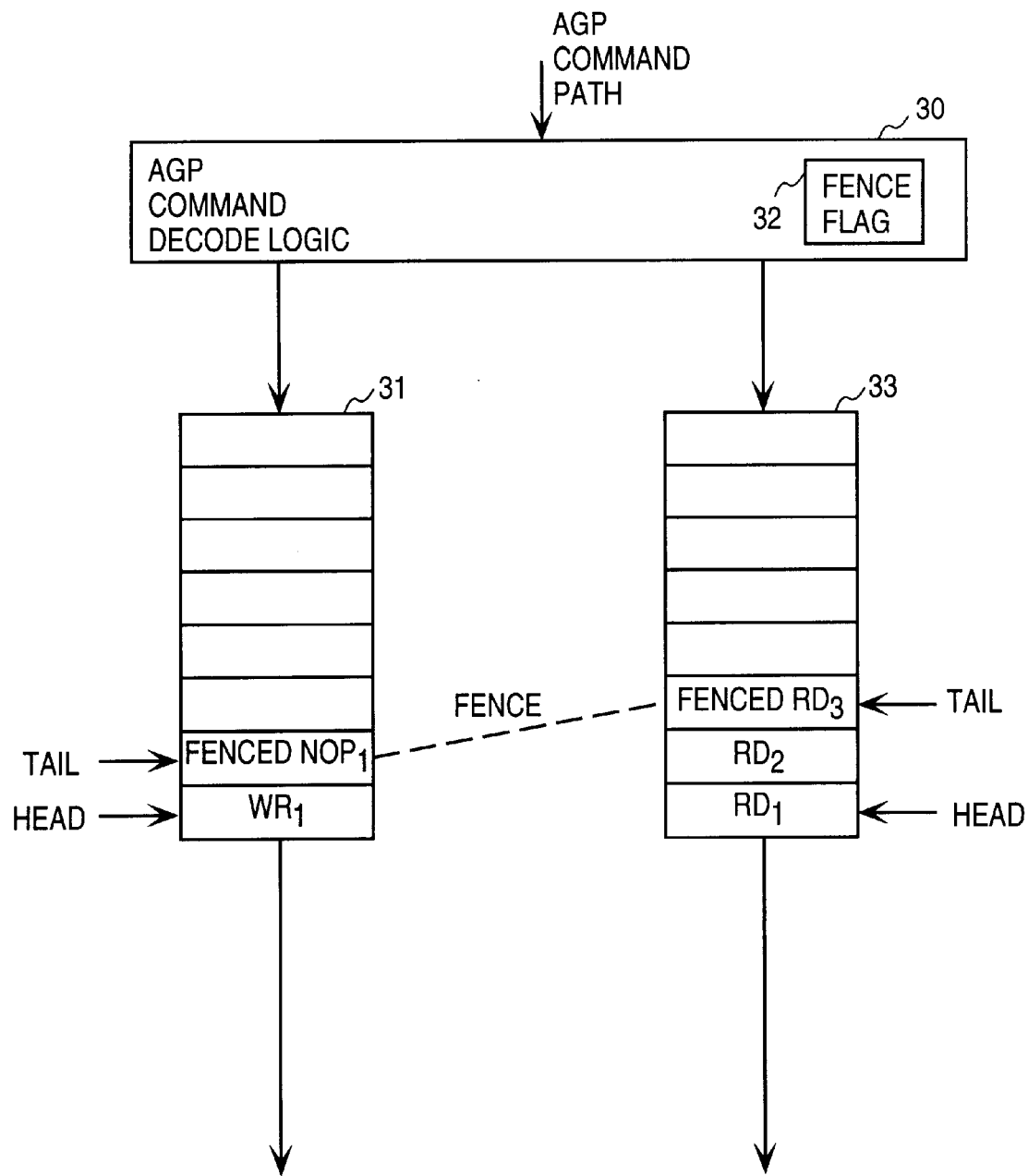
FIG. 5 depicts the write and read command queues of FIG. 4 after receiving a second sequence of commands.

As discussed above, there is no restriction on the reordering of read commands relative to one another so that read arbitration logic 49 selects from read commands in read buffer 45 according to optimization criteria (e.g., page hit optimization). In FIG. 5, read buffer 45 is shown in a lateral format to emphasize this unrestricted reordering policy.

Command arbitration logic 51 arbitrates between write commands received from write arbitration logic 47 and read commands received from read arbitration logic 49 according to certain optimization criteria. Command arbitration logic outputs control signals to memory access logic 27 according to the selected write or read command. From the perspective of the AGP command interface 21 and the AGP reordering logic 23, once control signals corresponding to a selected write or read command have been output by the command arbitration logic, the selected write or read command is considered to be retired. After memory access commands have been used to generate control signals to memory access logic 27, they may not be further reordered relative to one another. Such memory access commands are said to have been ordered for execution in a fixed sequence.

Figure 4:
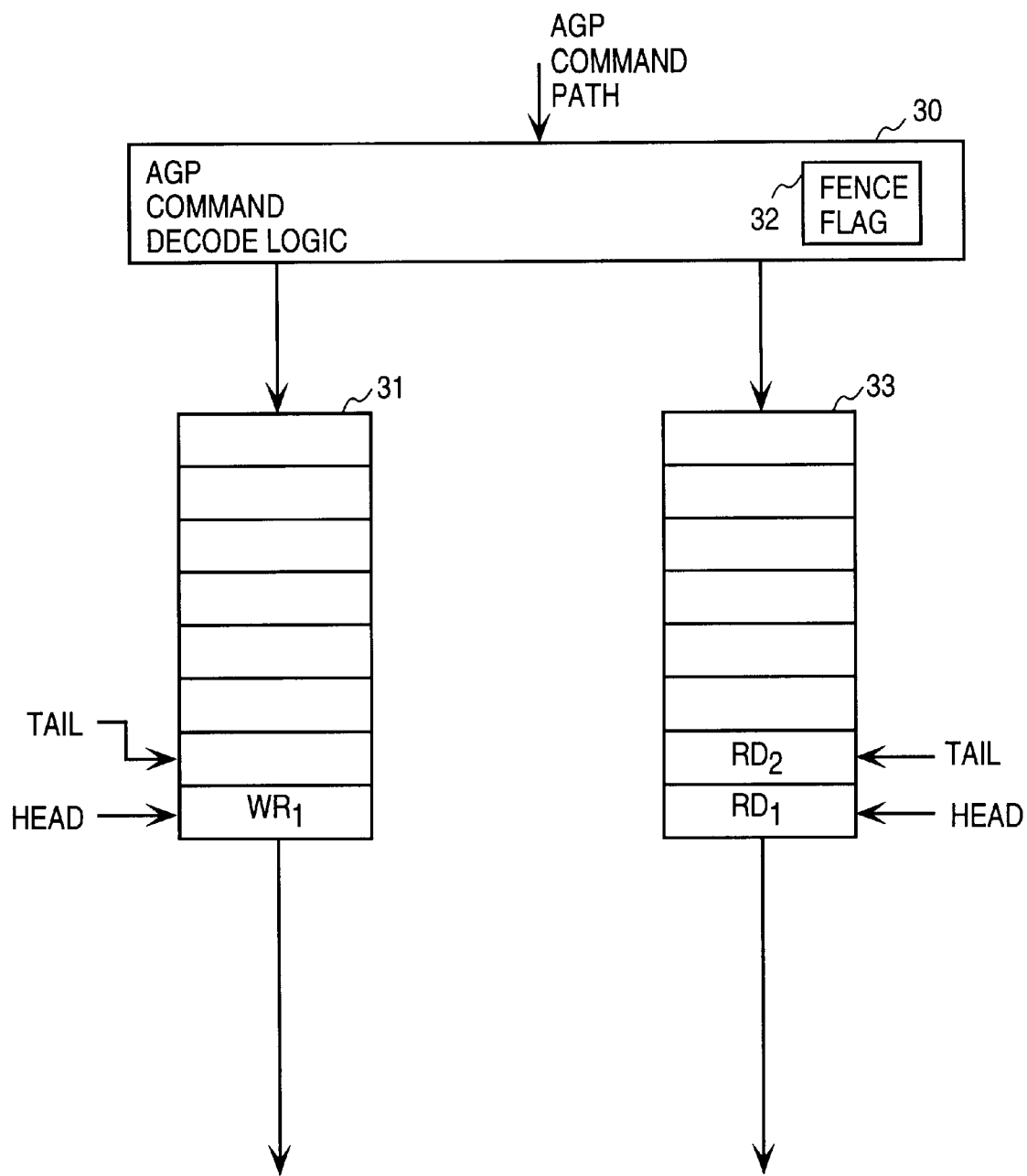
FIG. 4 depicts write and read command queues according to one embodiment of the present invention after receiving a first sequence of commands.

FIG. 4 depicts the state of the write and read command queues after the following exemplary sequence of memory access commands have been received and before the commands have been dequeued into the AGP command reordering logic:

RD1, WR1, RD2                      Sequence 1:

(RD2 being received last)

As shown in FIG. 4, the write command WR1 has been enqueued in the write command queue 31, and the two read commands, RD1 and RD2, have been enqueued in the read command queue 33. In FIG. 4, the write and read command tail pointers are pointed at storage locations in their respective queues to which the most recent memory access command has been written. Because, at this point, WR1 is the only command enqueued in the write command queue 31, the head and tail pointers for the write command queue 31 point to the same storage location. It will be appreciated that, in an alternative embodiment, the tail pointer could point to the next vacant storage location in the queue instead of the most recently filled location.

FIG. 5 depicts the state of the write and read command queues after the following exemplary sequence of commands is received in the AGP command decode logic 30 and before WR1, RD1 or RD2 have been dequeued:

FENCE, RD3                          Sequence 2:

As described above, when a fence command is received in the AGP command decode logic 30, the fence flag 32 is set. Note that the fence command itself is not enqueued so that unlike prior-art techniques, no queue storage is consumed by the fence command. If a memory access command is received while the fence flag 32 is set, the memory access command is enqueued in the write or read command queue (31, 33) together with an indication that the command succeeded a fence command.

According to one embodiment of the present invention, an additional bit, called a "fence bit", is provided in each storage element within the write and read command queues. An enqueued memory access command having a set fence bit is referred to as a "fenced" memory access command. For example, a read command received in the AGP command decode logic 30 while the fence flag 32 is set is enqueued in the read command queue 33 with a set fence bit and is referred to as a fenced read command. A write command received in the AGP command decode logic 30 when the fence flag is set is likewise enqueued in the write command queue 31 with a set fence bit and is referred to as a fenced write command.

Based on the foregoing discussion, fence flag 32 is set when the fence command is received in the AGP command decode logic 30, and then, when the read command RD3 is received, it is enqueued in the read command queue 33 with a set fence bit (hence the designation "FENCED RD3" in FIG. 5). According to one embodiment of the present invention, in response to receiving the read command while the fence flag is set, a synchronization value is enqueued in the write command queue 31 concurrently or immediately after the fenced read command FENCED RD3 is enqueued in the read command queue 33. Recall from earlier discussion that it is not possible for one of the write and read command queues to enqueue a memory access command without the other of the write and read command queues also having an available entry. Thus, because there is room in read command queue 33 to enqueue FENCED RD3, it follows that there is room in write command queue 31 to enqueue the synchronization value.

In FIG. 5, the enqueued synchronization value is designated "FENCED NOP1". The reason for the terminology "FENCED NOP1" is that, according to one embodiment of the present invention, a synchronization value is an invalid command or no-operation (NOP) indicated by a synchronization bit. As discussed below, the synchronization bit may be provided for by an extra bit in each entry of the write and read command queues (31 and 33).

As described below, the FENCED RD3 and FENCED NOP1 entries in the write and read command queues (31 and 33) define a fence across which command reordering may not occur. This is signified in FIG. 5 by the dashed line labeled "FENCE" extending between the FENCED RD3 and FENCED NOP1 queue entries.

Figure 6:
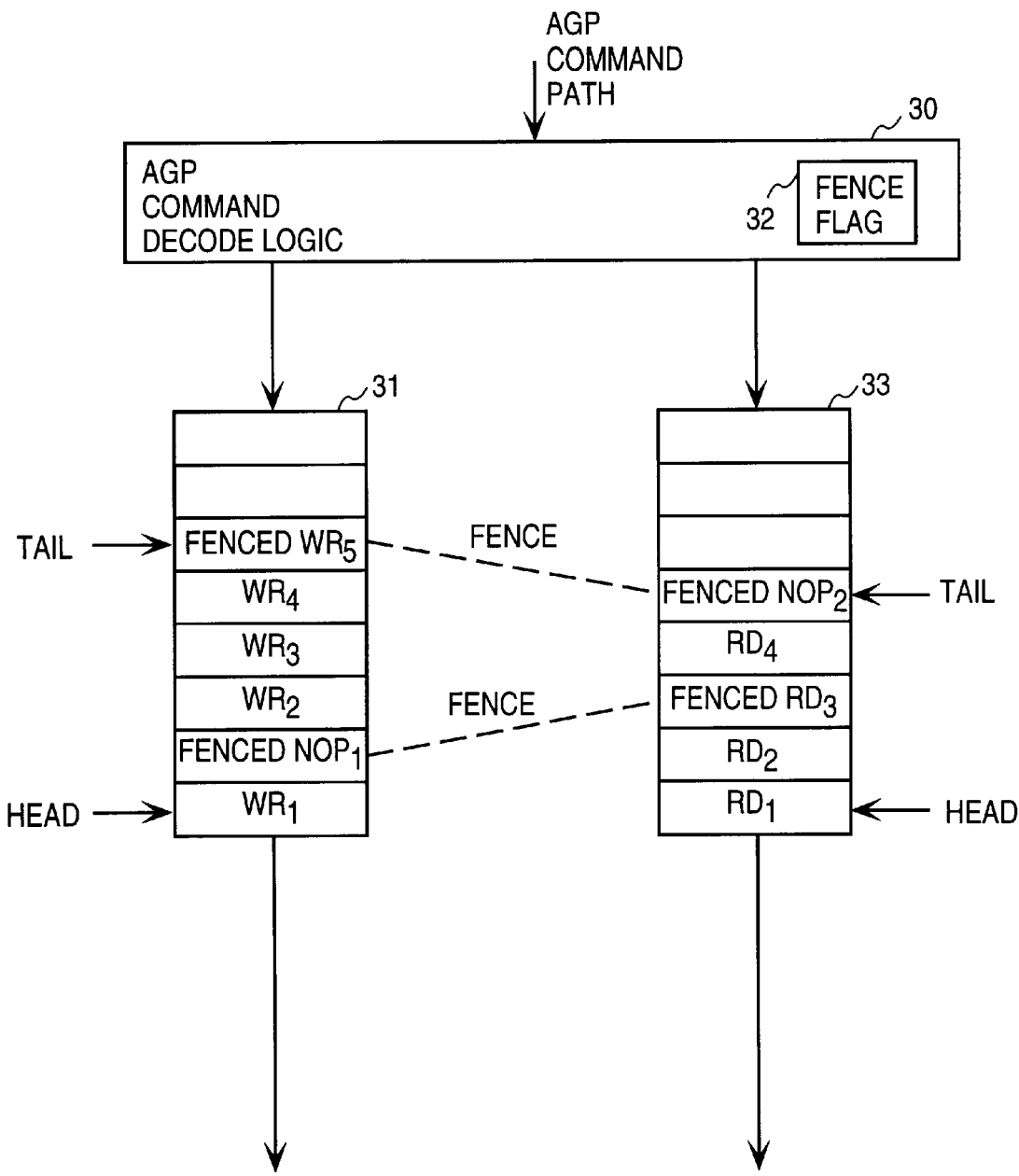
FIG. 6 depicts the write and read command queues of FIG. 5 after receiving a third sequence of commands.

FIG. 6 depicts the state of the write and read command queues after the following exemplary sequence of commands is received in the AGP command decode logic 30 and before the commands received in exemplary command sequence 1 and exemplary command sequence 2 have been dequeued:

WR2, WR3, RD4, WR4, FENCE, WR5                Sequence 3:

It will be appreciated that command dequeuing may occur concurrently with command enqueuing so that it is likely that commands received in at least exemplary command sequence 1 would likely have been dequeued by the time exemplary command sequence 3 is received. Assuming that exemplary sequence 1 commands have not yet been dequeued is nonetheless helpful for understanding the manner in which commands are enqueued in the write and read command queues 31 and 33.

As shown in FIG. 6, read command RD4 is enqueued in the read command queue 33 behind fenced read command FENCED RD3. Likewise write commands WR2, WR3 and WR4 are enqueued in the write command queue 31 behind synchronization value FENCED NOP1. Recall that the fence flag 32 is reset upon receipt of a non-fence command so that receipt of command RD3 in exemplary command sequence 2 caused the fence flag 32 to be reset. For this reason, the fence bit is not set when write command WR2 (the next command received after RD3) is enqueued.

As indicated in exemplary command sequence 3, a fence command follows WR4 so that the fence flag 32 is set when command WR5 is received in the AGP command decode logic 30. Consequently, the fence bit is set when WR5 is enqueued in the write command queue 31 as indicated by the designation "FENCED WR5" in FIG. 6. Also, a synchronization value designated "FENCED NOP2" is enqueued in the read command queue 33 either concurrently with or immediately after the enqueuing of WR5. A dashed line labeled "FENCE" is shown extending between FENCED WR5 and FENCED NOP2 to indicate that commands may not be reordered across the fence.

Figure 7:
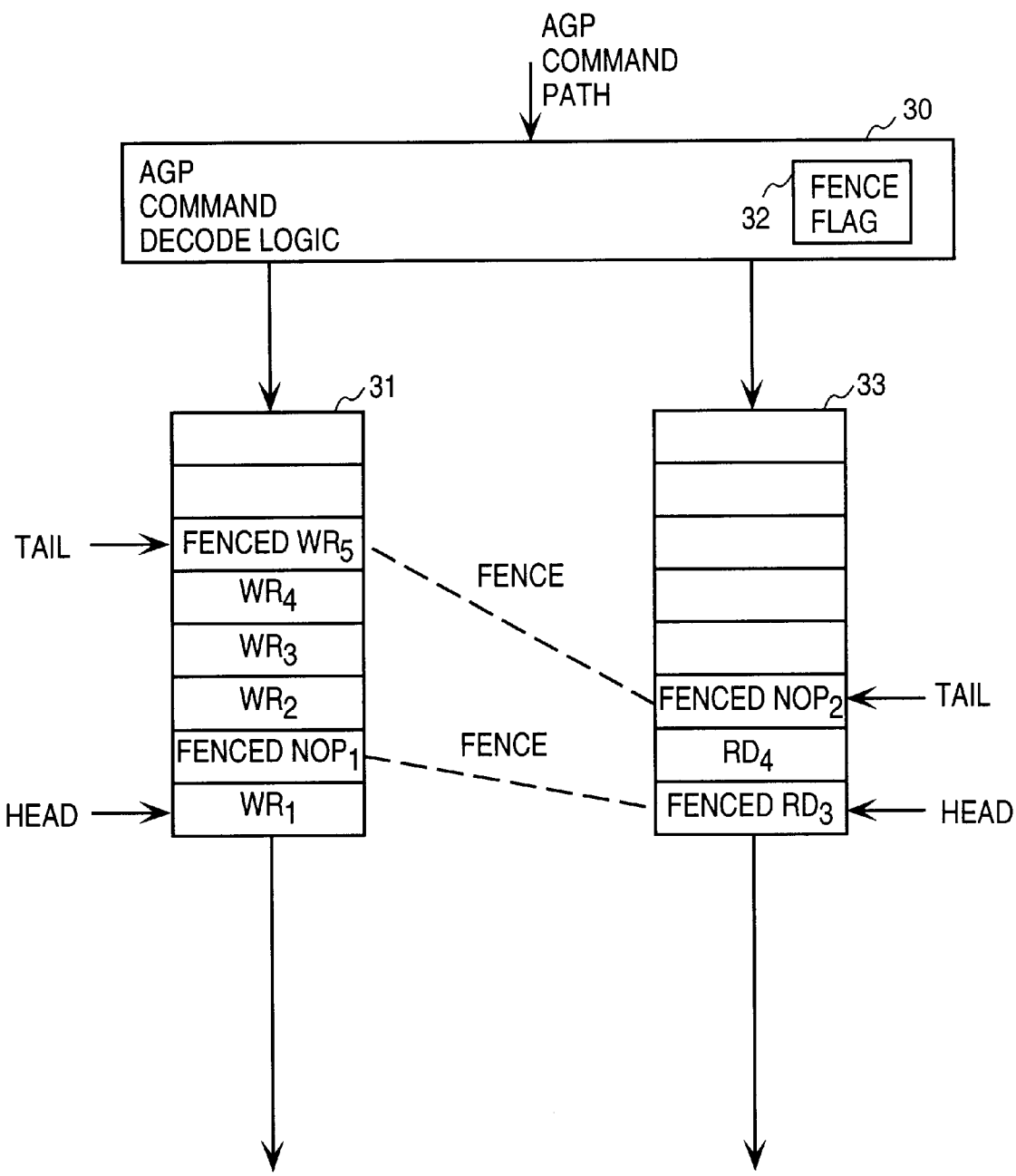
FIG. 7 depicts the write and read command queues of FIG. 6 after a first set of commands have been dequeued.

FIG. 7 depicts the state of the write and read command queues (31 and 33) after read commands RD1 and RD2 have been dequeued. At this point, the fenced read command FENCED RD3 is present at the head of the read command queue 33, but the corresponding synchronization value FENCED NOP1 has not yet advanced to the head of the write command queue 31. According to one embodiment of the present invention, a fenced memory access command cannot be dequeued from either the read command queue 33 or the write command queue 31 unless the following two conditions are satisfied:

1. A synchronization value corresponding the fenced memory access command enqueued in one of the write and read command queues has advanced to the head of the other of the write and read command queues.

2. All memory access commands previously dequeued into the AGP command reordering logic have been ordered for execution in a fixed sequence (i.e., flushed from the command reordering logic).

According to one embodiment of the present invention the second condition is determined based upon the write/read buffer empty signals input to the dequeue logic (element 37 of FIG. 3). This is discussed in greater detail below.

Returning to FIG. 7, the first condition set forth above requires that the fenced read command FENCED RD3 be delayed or blocked from being dequeued at least until the write command WR1 is dequeued and the synchronization value FENCED NOP1 is advanced to the head of the write command queue 31. The effectiveness of the synchronization value FENCED NOP1 can now be appreciated. The synchronization value indicates which commands from the write command queue may be dequeued into the AGP command reordering logic (element 23 of FIG. 3) without crossing the fence. This is significant in view of the fact that memory access commands may otherwise be dequeued from the write command queue 31 and the read command queue 33 independently of one another. Also, enqueuing synchronization values to correspond to fenced memory access commands does not require enlargement of read or write command queues.

Figure 8:
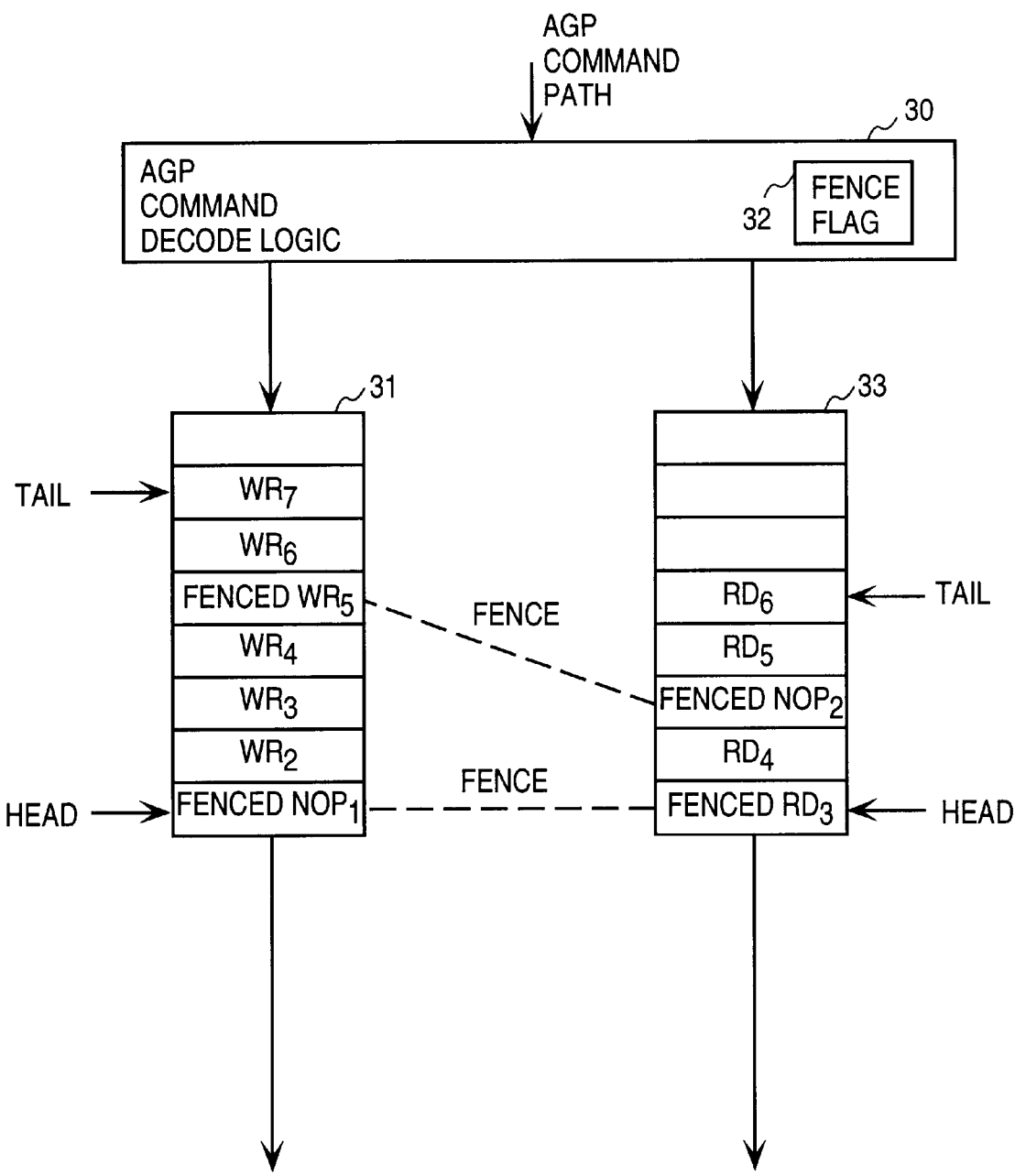
FIG. 8 depicts write and read command queues according to one embodiment of the present invention having a synchronization value and a fenced memory access command at their respective heads.

FIG. 8 depicts the state of the write and read command queues (31 and 33) after the write command WR1 has been dequeued from the write command queue 31. After condition two (set forth above) for dequeuing fenced memory access commands is satisfied, fenced read command FENCED RD3 may be dequeued. As shown in FIG. 8, additional memory access commands WR6, WR7, RD5 and RD6 have been received since the time at which the write and read command queues were in the state depicted in FIG. 7.

According to one embodiment of the present invention, fenced read command FENCED RD3 and synchronization value FENCED NOP1 are dequeued concurrently. However, because the synchronization bit is set in the synchronization value, write buffer allocation logic (element 41 of FIG. 3) in the AGP command reordering logic (element 23 of FIG. 3) does not buffer the synchronization value for execution.

Figure 9:
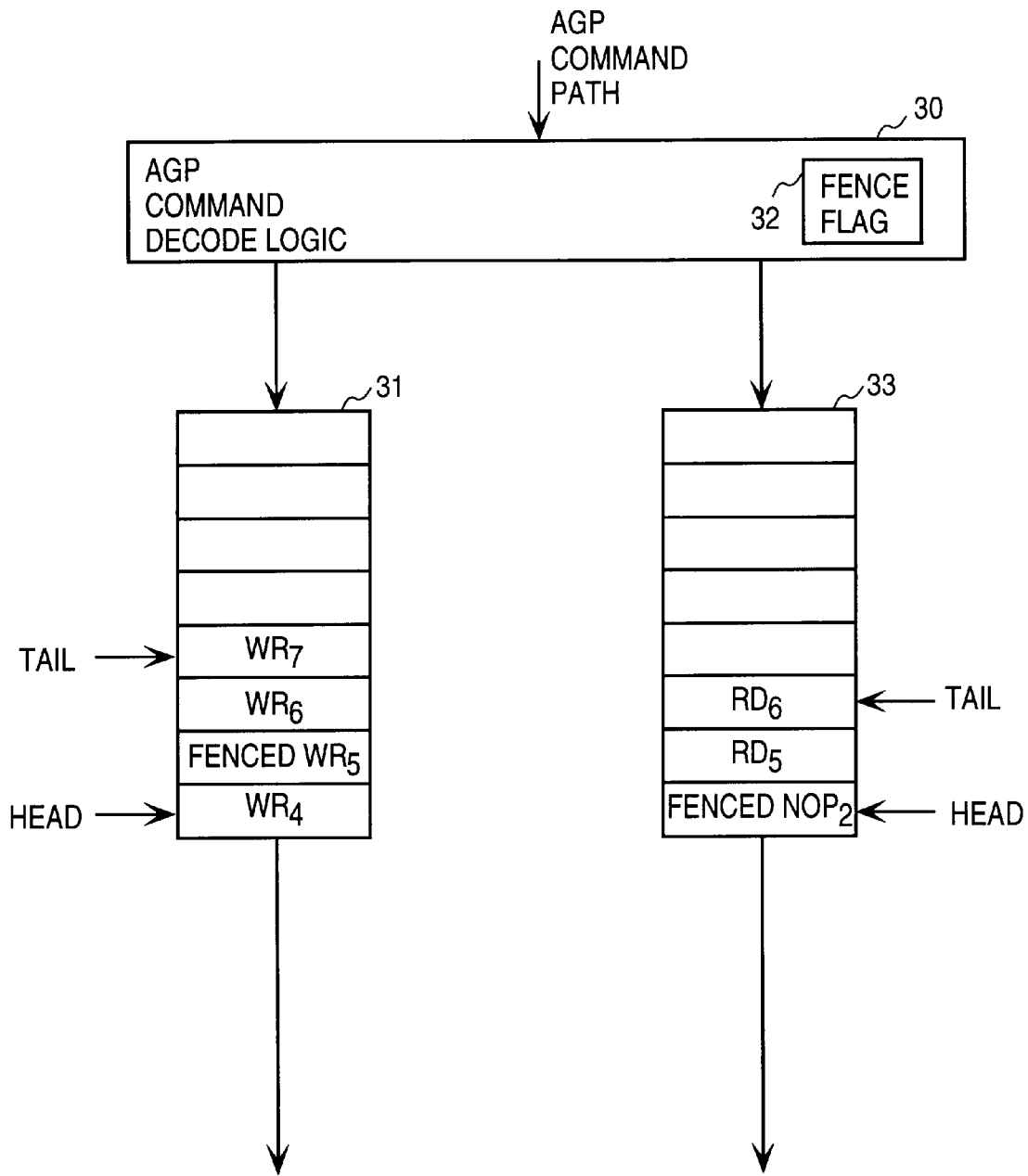
FIG. 9 depicts write and read command queues according to one embodiment of the present invention having a non-fenced write command and a synchronization value at their respective heads.

FIG. 9 depicts the state of the write and read command queues 31 and 33 after the synchronization value FENCED NOP1, read commands FENCED RD3 and RD4, and write commands WR2 and WR3 have been dequeued. At this point, the synchronization value FENCED NOP2 appears at the head of the read command queue 33. According to one embodiment of the present invention, the conditions that must be satisfied before a fenced memory access command may be dequeued must also be satisfied before a synchronization value may be dequeued. In other words, regardless of whether a fenced memory access command or the corresponding synchronization value first reaches the head of its respective queue, neither can be dequeued until the other also reaches the head of its queue.

Figure 10:
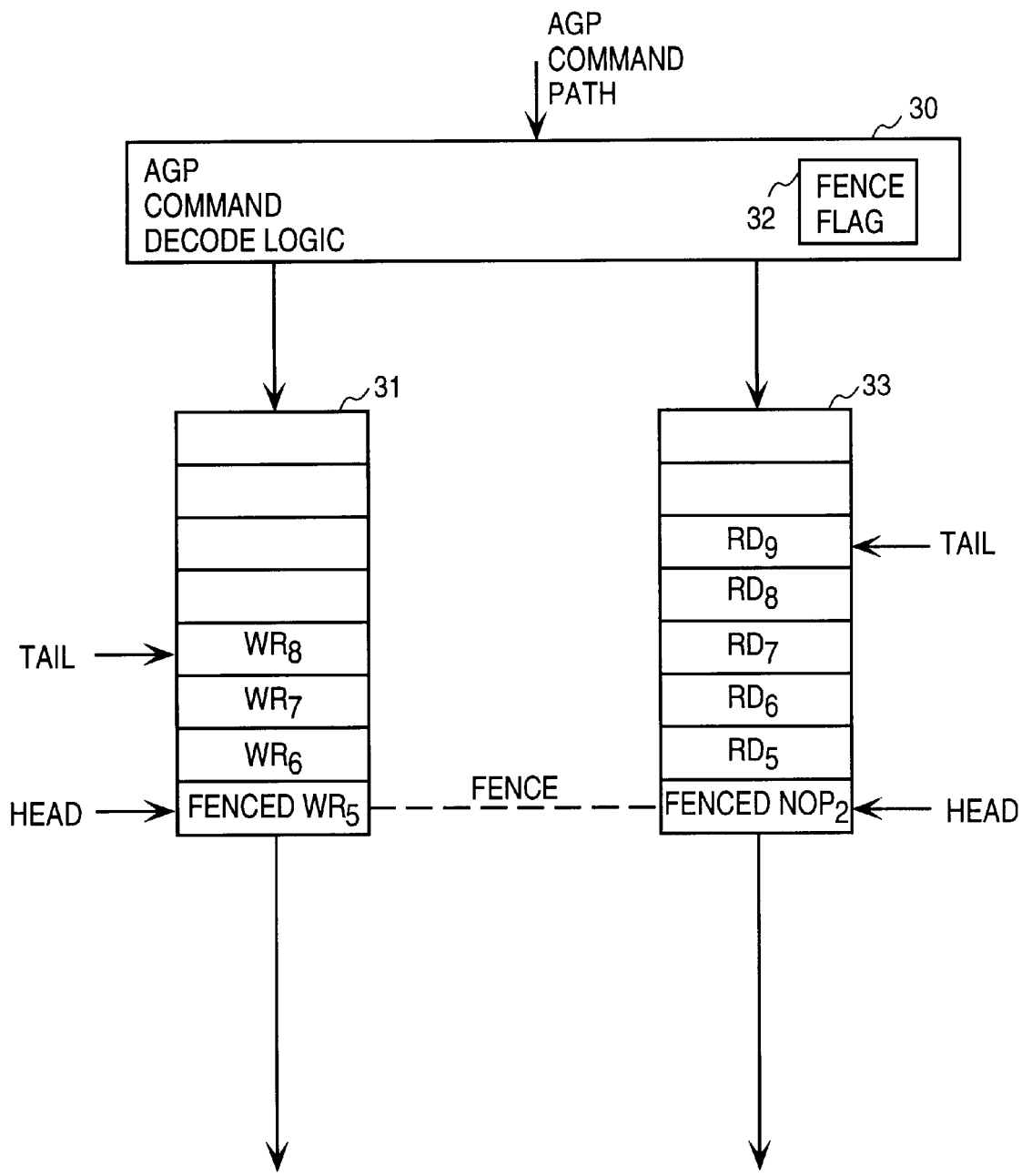
FIG. 10 depicts write and read command queues according to one embodiment of the present invention having a fenced write command and a synchronization value at their respective heads.

FIG. 10 depicts the state of the write and read command queues 31 and 33 after the fenced write command FENCED WR5 has advanced to the head of the write command queue 31. Once it is determined that the previously dequeued memory access commands have been flushed from the AGP command reordering logic (e.g., element 23 of FIG. 3), the fenced write command FENCED WR5 and the synchronization value FENCED NOP2 may both be dequeued. As indicated by the exemplary enqueued commands WR8, RD7, RD8 and RD9, memory access commands continue to be enqueued in the manner thus described.

Figure 11:
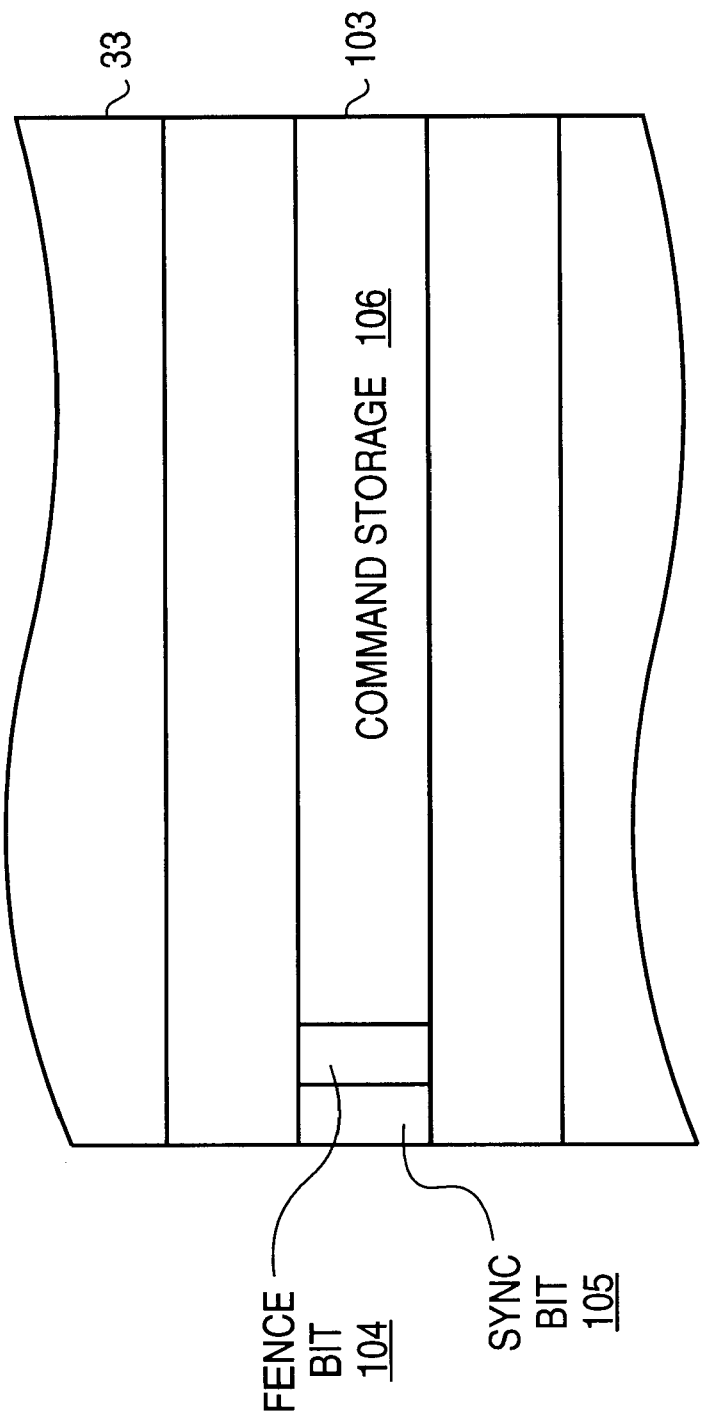
FIG. 11 depicts the structure of an entry in a read command queue according to one embodiment of the present invention.

FIG. 11 depicts the structure of an entry 103 in read command queue 33 according to one embodiment of the present invention. As shown, read command queue entry 103 includes a command storage area 106 to store a memory read command, a fence bit 104 that is either set or reset to indicate a fenced or non-fenced read command, and a synchronization ("sync") bit 105 to indicate whether the value in command storage 106 is a valid read command or the overall entry is a synchronization value. While the entry 103 is depicted as part of the read command queue 33, it will be appreciated that write command queue 31 may include entries having a similar structure. Also, the exact location of the sync and fence bits (105 and 104) within entry 103 and the exact number of bits allocated to the sync and fence indicators may be changed without departing from the spirit and scope of the present invention. Further, the sync and fence indicators may even be maintained separately from the write and read command queues 31 and 33 so long as the indicators can be associated with entries in the write and read command queues 31 and 33.

Figure 12:
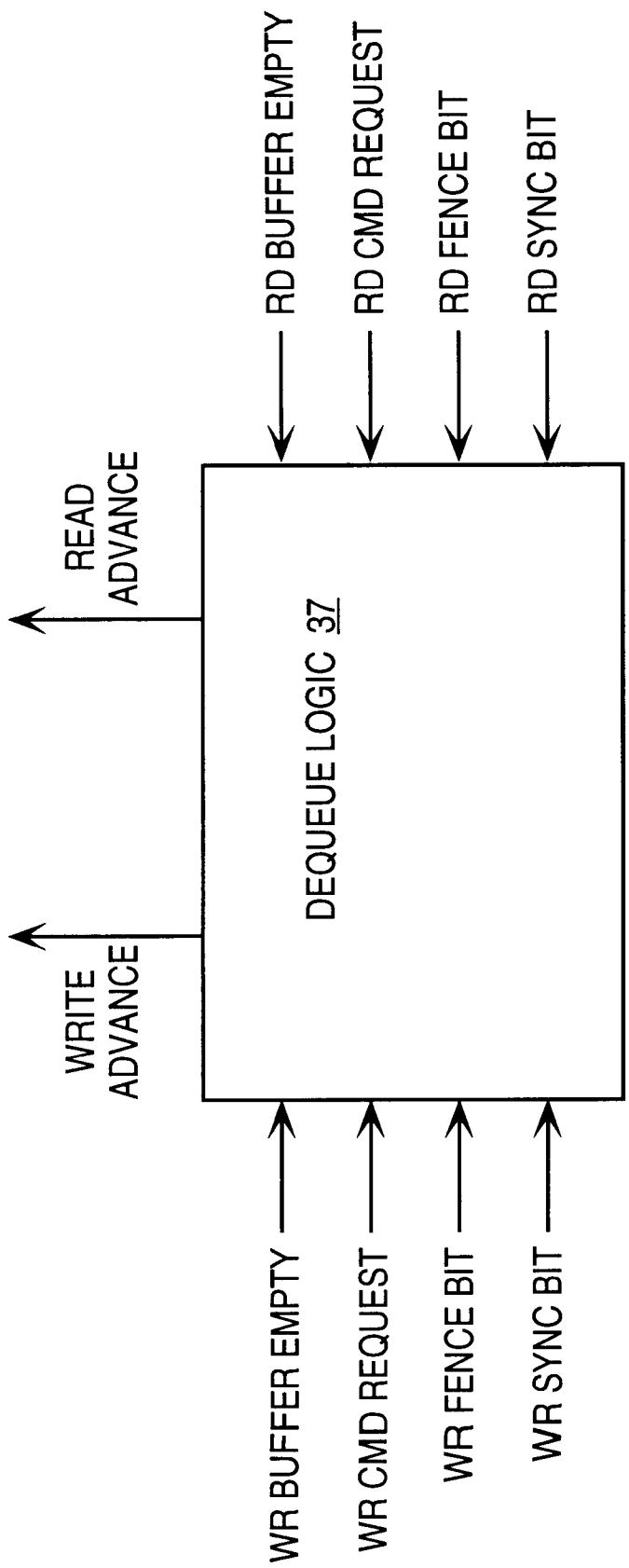
FIG. 12 depicts signals input to and output from a dequeue logic unit of the present invention.

FIG. 12 is a diagram depicting in greater detail the signals input to and output from dequeue logic 37. Recall that dequeue logic 37 is the component of the AGP command reordering logic 23 responsible for issuing write and read advance signals to the write and read command queues (elements 31 and 33 of FIG. 3), respectively. The write advance and read advance signals output by dequeue logic 37 serve the purpose discussed above in reference to FIG. 3. The write buffer empty, write command request, read buffer empty and read command request signals (depicted in FIG. 12 as "WR BUFFER EMPTY", "WR CMD REQUEST", "RD BUFFER EMPTY" and "RD CMD REQUEST", respectively) are the EMPTY and REQ signals issued to dequeue logic 37 by the write allocation logic (element 41 of FIG. 3) and the EMPTY and REQ signals issued to dequeue logic 37 by the read allocation logic (element 39 of FIG. 3), respectively, and also serve the purpose discussed above in reference to FIG. 3.

According to one embodiment of the present invention, the write fence bit, write sync bit, read fence bit and read sync bit signals (depicted in FIG. 12 as "WR FENCE BIT", "WR SYNC BIT", "RD FENCE BIT", and "RD SYNC BIT", respectively) input to dequeue logic 37 are received from the fence and sync bits of the entries at the respective heads of the write and read command queues (elements 31 and 33, respectively, of FIG. 3). As discussed below, each of the signals input to the dequeue logic 37 is used in branching steps of a method according to one embodiment of the present invention.

Figure 13:
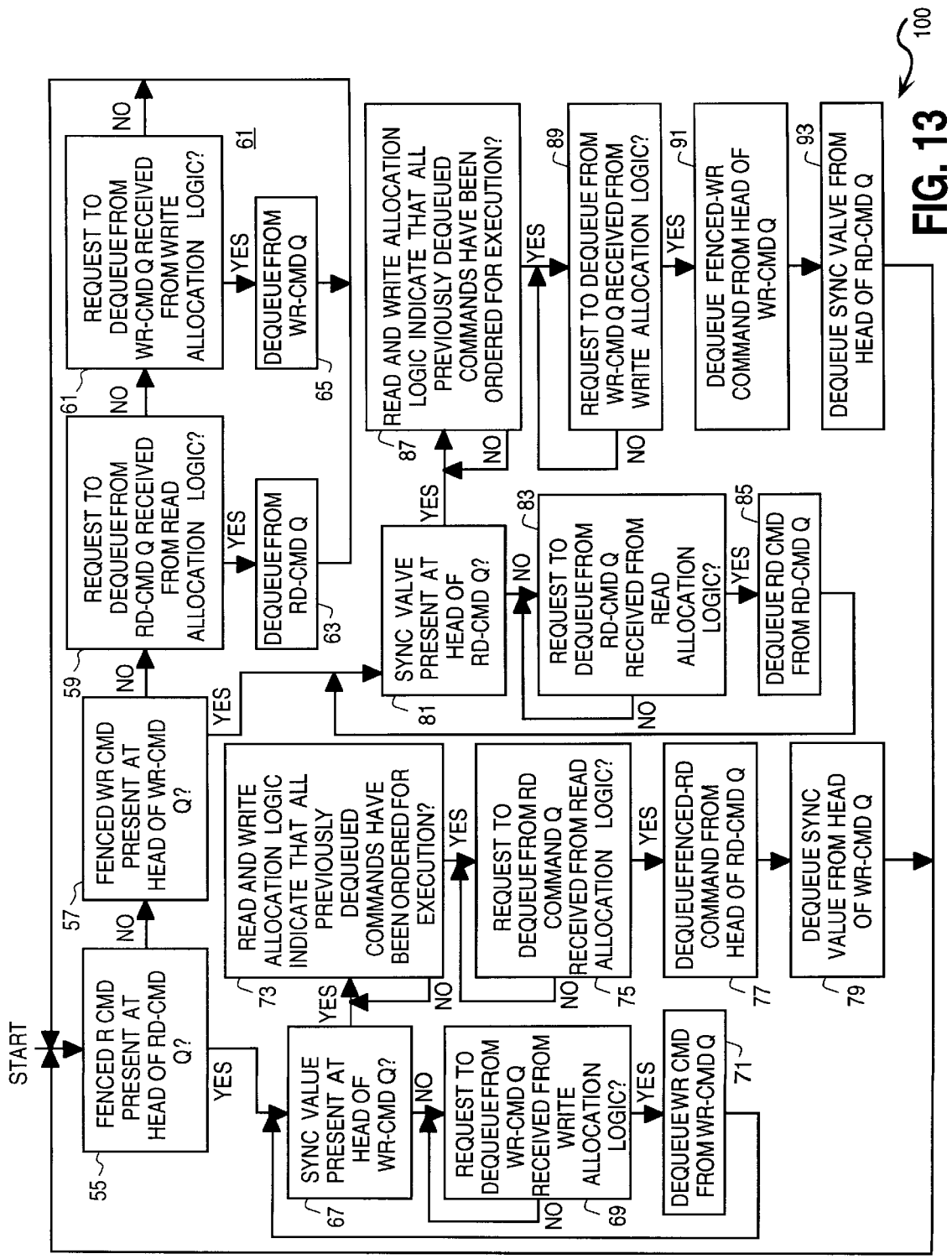
FIG. 13 depicts a method according to one embodiment of the present invention.

FIG. 13 depicts a method 100 implemented in dequeue logic 37 according to one embodiment of the present invention. At step 55, signal RD FENCE BIT is examined to determine if a fenced read command is present at the head of the read command queue (element 33 of FIG. 3). If not, then signal WR FENCE BIT is examined at step 57 to determine if a fenced write command is present at the head of the write command queue (element 31 of FIG. 3). If a fenced write command is not present at the head of the write command queue, then the signal RD CMD REQUEST is examined at step 59 to determine whether a request to dequeue a read command is pending from the read allocation logic (element 39 of FIG. 3). If not, then signal WR CMD REQUEST is examined at step 61 to determine whether a request to dequeue a write command is pending from the write allocation logic (element 41 of FIG. 3). If a request to dequeue a write command is not pending, method execution loops back to step 59 to check again for a request to dequeue from the read command queue.

If a request to dequeue a command from the read command queue is detected in step 59, a read command is dequeued at step 63 and method execution loops back to step 55. Similarly, if a request to dequeue a command from the write command queue is detected in step 61, a write command is dequeued at step 65 and method execution loops back to step 55. It will be appreciated that to optimize the execution of method 100, it may be desirable to return to step 57 from step 65 and also to skip the execution of step 57 after looping from step 63 to step 55. These and other optimizations of method 100 are considered to be within the spirit and scope of the present invention.

If a fenced read command is detected at the head of the read command queue in step 55, then the value present at the head of the write command queue is examined in step 67 to determine if it is a synchronization value. As discussed above, this is accomplished according to one embodiment of the present invention by examining the WR SYNC BIT signal input to the dequeue logic (element 37 of FIG. 12). If a synchronization value is not present at the head of the write command queue, then at step 69 the WR CMD REQUEST signal is iteratively examined until it indicates a request to dequeue a value from the write command queue. Then, at step 71, a write command is dequeued from the write command queue and method execution loops back to step 67 to determine if the value advanced to the head of the write command queue is now a synchronization value.

If, at step 67, a synchronization value is detected at the head of the write command queue, then the WR BUFFER EMPTY and RD BUFFER EMPTY signals input to the dequeue logic by the write and read allocation logic, respectively, are iteratively examined until they indicate that all commands previously dequeued from the write and read command queues have been flushed from the AGP command reordering logic (element 23 of FIG. 3). As indicated above, this is one way to determine whether the previously dequeued commands have been ordered for execution in a fixed sequence.

Once the WR BUFFER EMPTY and RD BUFFER EMPTY signals indicate that previously dequeued commands have exited the AGP command reordering logic, then the RD BUFFER REQUEST signal is iteratively examined at step 75 until it indicates a request to dequeue a read command from the read command queue. According to another embodiment of the present invention, step 75 may be skipped because the RD BUFFER REQUEST signal is asserted any time the RD BUFFER EMPTY signal is asserted.

At step 77, the fenced read command is dequeued from the read command queue and at step 79 the synchronization value is dequeued from the head of the write command queue. As discussed above, steps 77 and 79 may be performed concurrently or in reverse order from that depicted in method 100. After the fenced read command and the synchronization value have been dequeued from their respective command queues, method execution loops back to step 55.

As shown in FIG. 13, steps 81, 83, 85, 87, 89 and 91 mirror steps 67, 69, 71, 73, 75, 77 and 79 described above, except that the roles of the read command queue and the write command queue are reversed. Also, while steps 55 and 57 of method 100 are described as determining whether a fenced read command or a fenced write command, respectively, is present at the head of a command queue, each of steps 55 and 57 must also include a determination of whether a synchronization value is present at the head of the command queue. This is because, according to one embodiment of the present invention, a synchronization value may not be dequeued from the head of one of the write and read command queues unless a corresponding fenced memory command is present at the head of the other of the write and read command queues. Additional steps (not shown), essentially mirroring the logic of steps 67, 69, 71, 73, 75, 77 and 79, must be executed in method 100 to ensure that a fenced memory access command is advanced to the head of a command queue upon determining that a synchronization value is present at the head of the other command queue. After both the synchronization value and the fenced memory access command have been advanced to the head of their respective command queues, and after memory access commands previously dequeued to the AGP command reordering logic have been ordered for execution in a fixed sequence, the synchronization value and the fenced memory access command may be dequeued.

Having described a method for practicing the present invention, it is emphasized that the individual steps therein may be performed by a processor programmed with instructions that cause the processor to perform the recited steps, specific hardware components that contain hard-wired logic for performing the recited steps, or any combination of programmed computer components and custom hardware components. Nothing disclosed herein should be construed as limiting the present invention to a single embodiment wherein the recited steps are performed by a specific combination of hardware components. Moreover, in the case of a programmed processor implementation, sequences of instructions which may be executed by a processor to carry out the method of the present invention may be stored and distributed on a computer readable medium or may be transmitted across a computer network via a carrier wave.

While embodiments of the present invention have been described above as having two command queues and generally in terms of fencing memory access commands, alternate embodiments of the present invention may include an arbitrary number of queues and may be used to fence an arbitrary number of different types of commands or other values that are candidates for reordering. Further, in a system having multiple queues for receiving reorderable values, fence indicators and synchronization indicators may be defined to correspond to various subsets of the queues. For example, in a device having queues A, B, C, D and E, it would be possible to define fence and synchronization indicators to fence reorderable values entered into queues A, B and C, but not D and E. As another example, in the same device, another set of fence and synchronization indicators could be used to fence reorderable values entered into queues A, B, D and E, but not C.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising the steps of:
   receiving in succession a fence command and a first executable command;
   queuing in a first queue the first executable command together with an indication that the first executable command succeeded the fence command;
   queuing a synchronization value in a second queue; and
   delaying the first executable command from being dequeued from the first queue until the synchronization value is advanced to a head of the second queue.

2. The method of claim 1 further comprising the step of delaying the synchronization value from being dequeued from the second queue until the first executable command is advanced to a head of the first queue.

3. The method of claim 1 further comprising the step of delaying the first executable command from being dequeued from the first queue until executable commands enqueued in the first and second queues prior to said step of receiving a fence command have been dequeued from the first and second queues and ordered for execution in a fixed sequence.

4. The method of claim 1 further comprising the step of concurrently dequeuing the first executable command and the synchronization value from the first queue and the second queue, respectively.

5. A method comprising:
   receiving a fence command in a device that implements command reordering;
   queuing a first command that succeeds the fence command in either a read-command queue when the first command indicates a memory read operation or a write-command queue when the first command indicates a memory write operation;

queuing a synchronization value either in the read-command queue when the first command indicates the memory write operation or in the write-command queue when the first command indicates the memory read operation; and delaying the first command from being dequeued until commands received prior to the fence command have been dequeued and ordered for execution in a fixed sequence.

6. The method of claim 5 further comprising:

delaying the first command from being dequeued until the synchronization value is advanced to a head of the read-command queue if the first command indicates the memory write operation; and delaying the first command from being dequeued until the synchronization value is advanced to a head of the write-command queue if the first command indicates the memory read operation.

7. The method of claim 5 wherein receiving a fence command in a device that implements command reordering comprises receiving a fence command in a memory controller that implements command reordering.

8. In a device that implements command reordering, a method comprising the steps of:

receiving a fence command;

receiving a first memory access command;

queuing the first memory access command in a first queue together with an indication that the first memory access command was received after the fence command;

queuing a synchronization value in a second queue;

dequeuing commands from a head of the first queue into command reordering logic until the first memory access command is advanced to the head of the first queue;

dequeuing commands from a head of the second queue into the reordering logic until the synchronization value is advanced to the head of the second queue; and delaying the first memory access command from being dequeued into the reordering domain until commands previously dequeued into the reordering domain have been ordered for execution.

9. In a memory controller having a first queue and a second queue wherein memory access commands available to be dequeued from one of the first and second queues may be dequeued irrespective of whether memory access commands are available to be dequeued from the other of the first and second queues, a method comprising the steps of:

receiving in succession a fence command and a first memory access command;

queuing in the first queue the first memory access command together with an indication that the first memory access command succeeded the fence command;

queuing a synchronization value in the second queue; and maintaining the first memory access command in the first queue until the synchronization value is advanced to a head of the second queue.

10. The method of claim 9 wherein the first memory access command is a memory write command.

11. An apparatus comprising:

a fence flag that is set to a first state when a fence command is received in said apparatus and to a second state when an executable command is received in said apparatus;

a first plurality of storage locations to queue executable commands of a first type, each of said first plurality of storage locations including at least one fence bit to indicate that an executable command stored therein was received when said fence flag was in the first state; and a second a plurality of storage locations to queue executable commands of a second type, each of said second plurality of storage locations including at least one fence bit to indicate that an executable command stored therein was received when said fence flag was in the first state.

12. The apparatus of claim 11 wherein each of said first plurality of storage locations and each of said second plurality of storage locations further includes at least one synchronization bit to indicate a synchronization value.

13. The apparatus of claim 12 further comprising enqueuing logic to enqueue at a tail location of the first plurality of storage locations a first executable command of the first type and to set the at least one fence bit in the tail location if said fence flag was in the first state when the first executable command was received in said apparatus.

14. The apparatus of claim 12 wherein said enqueuing logic is configured to set the synchronization bit included in a tail location of the second plurality of storage locations to indicate a synchronization value at the tail location of the second plurality of storage locations if said fence flag was in the first state when the first executable command was received in said apparatus.

15. The apparatus of claim 12 further comprising dequeuing logic to remove executable commands of the first type from a head location of the first plurality of storage locations and to remove executable commands of the second type from a head location of the second plurality of storage locations, said dequeuing logic including synchronization logic to detect when the fence bit is set in the head location of the first plurality of storage locations and to dequeue no further executable commands from the first plurality of storage locations until a synchronization value is detected at the head location of the second plurality of storage locations.

16. The apparatus of claim 13 further comprising reordering logic to order in a fixed sequence executable commands dequeued from said first plurality of storage locations and said second plurality of storage locations by said dequeuing logic.

17. The apparatus of claim 16 wherein said synchronization logic delays dequeuing an executable command for which the fence bit is set until executable commands previously dequeued have been ordered in a fixed sequence for execution by said reordering logic.

18. An apparatus comprising:

means for receiving in succession a fence command and a first executable command;

means for queuing in a first queue the first executable command together with an indication that the first executable command succeeded the fence command;

means for queuing a synchronization value in a second queue; and means for delaying the first executable command from being dequeued from the first queue until the synchronization value is advanced to a head of the second queue.

* * * * *

UNITED STATES PATENT AND TRADEMARK OFFICE
CERTIFICATE OF CORRECTION

PATENT NO. : 6,047,334
DATED : April 4, 2000
INVENTOR(S) : Langendorf et al.

It is certified that error appears in the above-identified patent and that said Letters Patent is hereby corrected as shown below:

In column 1, at line 36, after "technique" insert --of--.

In column 2, at line 63, after "it" insert -- becomes --.

Signed and Sealed this

Eighth Day of May, 2001

Attest:

NICHOLAS P. GODICI

Attesting Officer     Acting Director of the United States Patent and Trademark Office